(12) United States Patent (10) Patent No.: US 9,024,211 B2
Stathis et al. (45) Date of Patent: May 5, 2015

(54) POWER AND COMMUNICATIONS GROMMET

(71) Applicant: Doug Mockett & Company, Inc., Torrance, CA (US)

(72) Inventors: Peter Stathis, San Francisco, CA (US); Derrick Hurst, San Francisco, CA (US); Charles Richard Lewis, Jr., Palo Alto, CA (US)

(73) Assignee: Doug Mockett & Company, Inc., Torrance, CA (US)

( * ) Notice: Subject to any disclaimer, the term of this patent is extended or adjusted under 35 U.S.C. 154(b) by 62 days.

(21) Appl. No.: 13/909,951

(22) Filed: Jun. 4, 2013

(65) Prior Publication Data

US 2013/0327569 A1 Dec. 12, 2013

Related U.S. Application Data

(60) Provisional application No. 61/656,923, filed on Jun. 7, 2012.

(51) Int. Cl.
| | |
|---|---|
| *H02G 3/18* | (2006.01) |
| *H02G 3/04* | (2006.01) |
| *A47B 97/00* | (2006.01) |
| *A47B 21/06* | (2006.01) |

(52) U.S. Cl.
CPC .............. *H02G 3/0406* (2013.01); *A47B 97/00* (2013.01); *A47B 2021/066* (2013.01); *A47B 2200/0082* (2013.01)

(58) Field of Classification Search
CPC ............. H02G 3/04; H02G 3/22; H02G 3/26; H02G 3/28; H02G 3/24; H02G 3/30; H02G 3/0406; H02G 3/00; H02G 3/12; B60R 16/0215; B60R 16/0222; F16L 5/00; F16L 5/02; A47B 21/06; A47B 2200/0082; A47B 2021/066; A47B 97/00
USPC ........... 174/480, 481, 50, 650, 152 G, 153 G, 174/135, 137, 142, 152 R, 153 R, 155, 156, 174/59; 220/3.2, 3.3, 3.8, 4.02; 16/2.1, 2.2; 439/131, 535, 571, 502, 528
See application file for complete search history.

(56) References Cited

U.S. PATENT DOCUMENTS

| | | | |
|---|---|---|---|
| 3,883,202 | A | 5/1975 | Konig |
| 4,372,629 | A | 2/1983 | Propst et al. |
| 4,551,577 | A | 11/1985 | Byrne |
| 4,747,788 | A | 5/1988 | Byrne |
| 4,828,513 | A | 5/1989 | Morrison |
| 4,864,078 | A | 9/1989 | Bowman |
| 5,107,072 | A | 4/1992 | Morgan |
| 5,149,277 | A | 9/1992 | Le Master |
| 5,231,562 | A | 7/1993 | Pierce et al. |
| 5,351,173 | A | 9/1994 | Byrne |
| 5,380,951 | A | 1/1995 | Comerci |

(Continued)

*Primary Examiner* — Angel R Estrada
(74) *Attorney, Agent, or Firm* — Sanford Astor Brooks Kushman P.C.

(57) ABSTRACT

A power, communications and data grommet mounted in an aperture in a work surface comprising, a housing adapted to fit into the aperture, the housing comprising a cap removably connected to a liner, the liner comprising an upper liner and a lower liner, the upper liner flaring outwardly to prevent the grommet from falling through the aperture, and a substantially cylindrical lower liner having a threaded outer surface, and a lock ring having inner threads to be threadably attached to the lower liner.

9 Claims, 13 Drawing Sheets

(56) References Cited

U.S. PATENT DOCUMENTS

| | | |
|---|---|---|
| 6,024,599 A | 2/2000 | Stathis |
| 6,028,267 A * | 2/2000 | Byrne .............................. 174/59 |
| 6,254,427 B1 * | 7/2001 | Stathis .......................... 439/535 |
| 6,492,591 B1 * | 12/2002 | Metcalf ........................... 174/53 |
| 7,141,744 B2 * | 11/2006 | Cloutier ......................... 174/650 |
| 7,163,409 B1 * | 1/2007 | Chen et al. ..................... 439/131 |
| 7,806,723 B2 * | 10/2010 | Chong et al. ................... 439/571 |
| 8,475,186 B1 * | 7/2013 | Sikkema et al. .............. 439/131 |

* cited by examiner

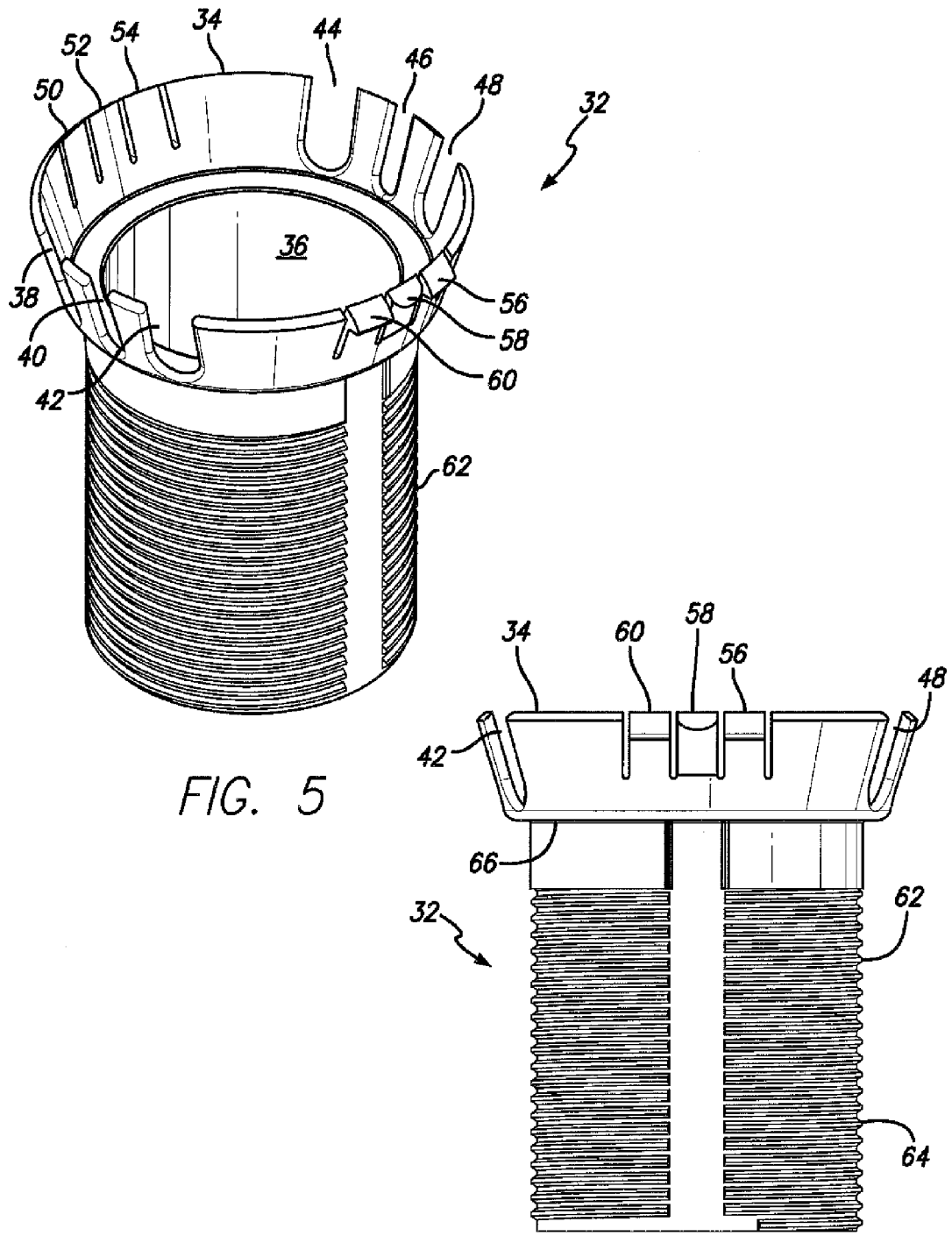

POWER AND COMMUNICATIONS GROMMET

CROSS-REFERENCE TO RELATED APPLICATIONS

This application claims the benefit of U.S. Provisional Application No. 61/656,923, filed Jun. 7, 2012, the disclosure of which is incorporated herein by reference in its entirety.

TECHNICAL FIELD

This invention relates to a power, communications and data grommet to supply electric, phone, video and data lines into a work surface, such as a conference table, boardroom table or office desk.

BACKGROUND

There is a need for an aesthetically pleasing method of supplying electric, phone, video and data devices into work surfaces, desks, counters, conference tables, boardroom tables and any other surfaces where power, data, or cord pass-through features are desirable. Present solutions to this problem generally involve a metal box, with or without a lid, making it difficult for a designer to integrate it into furniture in a pleasing manner. Designers have solved this problem by recessing the box beneath a table but this creates a problem of how to open the door, and how to avoid damaging the adjacent surface of the table while doing so.

Other designers offer interfaces that raise and lower the device, but these are all dependent on expensive electric devices to raise and lower the interface, resulting in a very expensive unit prone to failures of opening and closing.

SUMMARY

The power, communication and data grommet of this invention comprises a grommet adapted to be placed in an aperture in the desk or other work surface. An aperture is manufactured or drilled through the top of the work surface. A housing, which is adapted to fit into the aperture, comprises, on the top, a cap with a cap insert. The cap connects to a liner which comprises two parts, an upper liner which flares outward and stops the liner from falling through the aperture and a substantially cylindrical lower liner which slides into the aperture in the work surface. The cylindrical lower liner has an outside screw threaded surface.

Optionally, a cord wrap can be fitted around the lower liner and a circular lock ring threadably connects to the threads of the lower liner, holding the parts in place. Also optionally, a cable lock anchor can be placed above or below the lock ring, threaded to the lower liner. The lock anchor protrudes up the liner, allowing users to pass a wire or cable through, which is then attached to their computer, or other electronic device, or other device, to lock it so that it cannot be stolen.

BRIEF DESCRIPTION OF THE DRAWINGS

FIG. 5 is a perspective view of the full liner;
FIG. 6 is a front view of the full liner.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
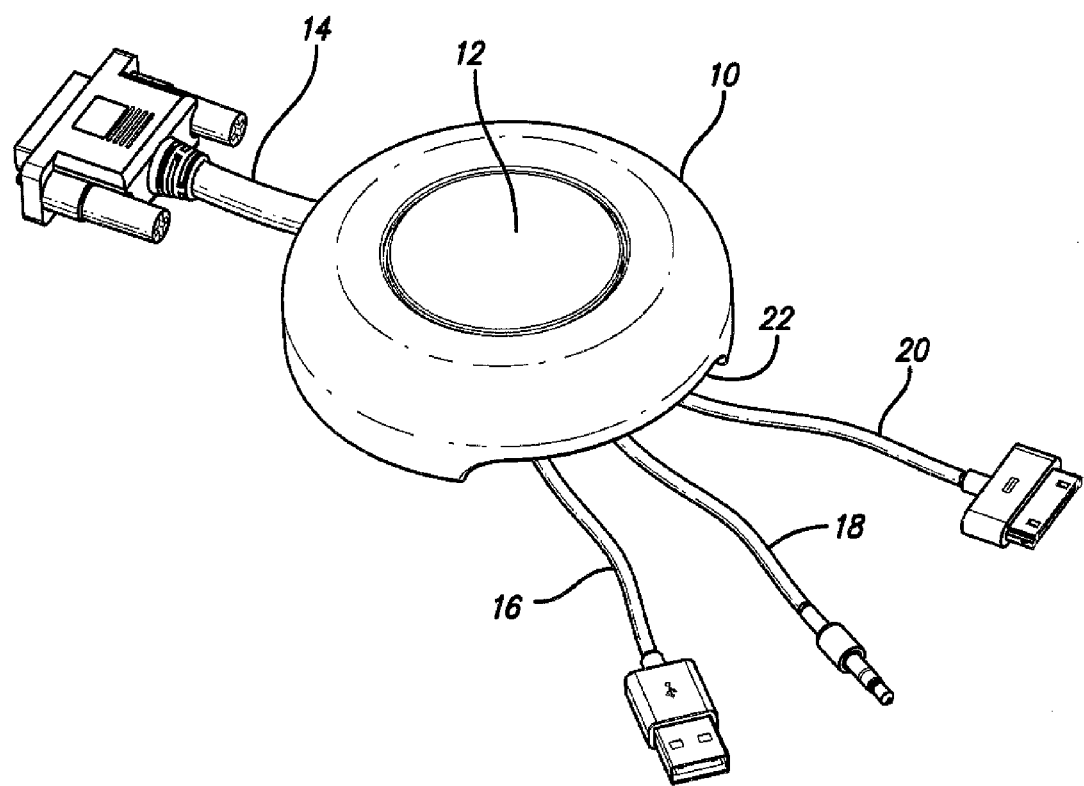
FIG. 1 is a perspective view of the top of the grommet of this invention.

Referring now to the drawings, there is shown in FIG. 1 a perspective view of the cap 10 of the grommet of the present invention. In the center of the cap 10 is a plain solid cap insert 12 which fits into a hole in the top of cap 10. A series of wires 14, 16, 18 and 20 are shown protruding from a raised edge or cut-out 22 in cap 10. There is optionally one or more similar raised edges in cap 10. The raised edges may be the same height or different heights. Wire 14 has a connector running to a computer, not shown. Wire 16 has a bus connector, wire 18 has a pole connector and wire 20 has a data connector. None of these wires are part of the grommet of the present invention. These wires pass through the center of the grommet as will be shown in later figures and are present to be used for connectors to various electronic or other devices. These wires are not a part of the invention and are present to explain how the grommet is used.

Figure 2:
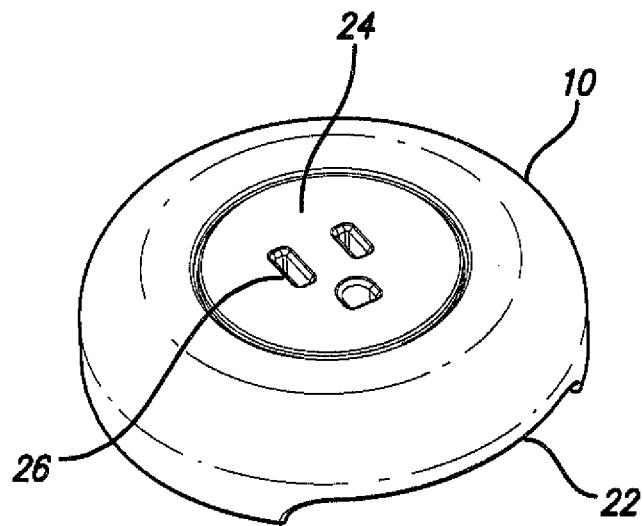
FIG. 2 is a perspective view of an alternate cap insert.

Referring now to FIG. 2 there is shown cap 10 with raised edge 22 and an alternate cap insert 24, with holes 26 for an electrical plug.

Figure 3:
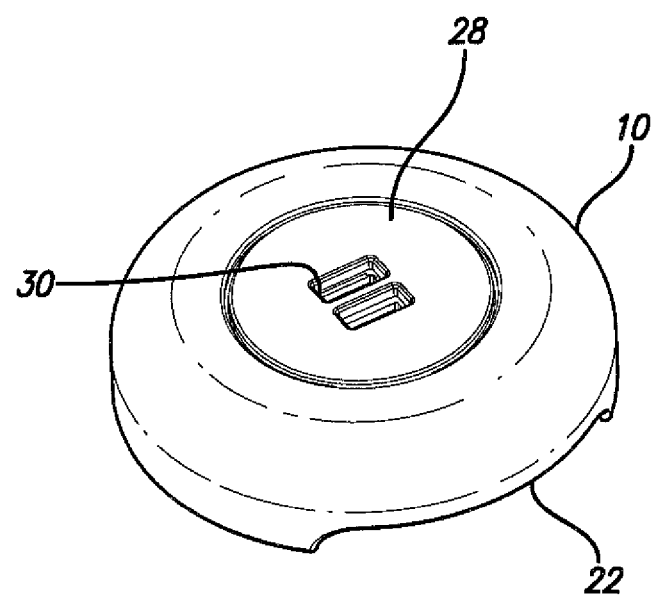
FIG. 3 is a perspective view of another alternate cap insert.

Referring now to FIG. 3 there is shown cap 10 with raised edge 22 and with a different cap insert 28 which has a data port 30, but may include any number of available and useful types of data and power connectors.

Figure 4:
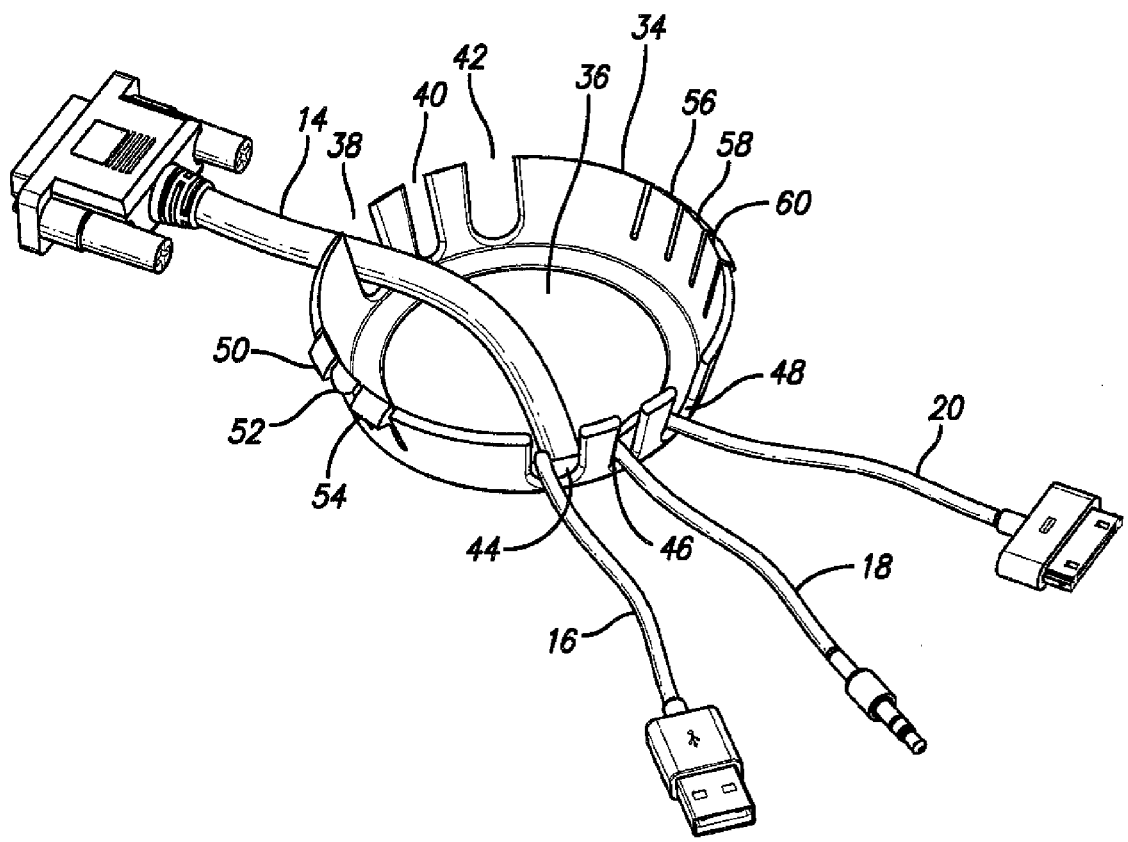
FIG. 4 is a perspective view of the top portion of the liner.

Referring now to FIGS. 4 and 5, there is shown the upper liner 34 of the full liner 32, shown in FIG. 5. Wires 14, 16, 18 and 20 are present as shown in FIG. 1. Upper liner 34 of liner 32 comprises a central aperture 36 and a series of cut-outs 38, 40 and 42 with like cutouts 44, 46 and 48 on the opposite side of upper liner 34. All of the cut-outs 38 through 48 allow wires to pass through the open cut-out spaces and also allow cap 10 to become removably connected to the top of upper liner 34.

Also shown in FIG. 4 are a series of knobs 50, 52 and 54, with the same type of knobs 56, 58 and 60, on the opposite side, on the top of upper liner 34. Knobs 50 through 60 connect with bottom flanges or knobs 74 (FIG. 9) inside of cap 10, to connect cap 10 to upper liner 34 of liner 32. FIG. 6 shows lower liner 62 of liner 32 which has screw threads 64 around substantially the entire outer surface of lower liner 62. Upper liner 34 and lower liner 62 are manufactured as one piece.

Figure 7:
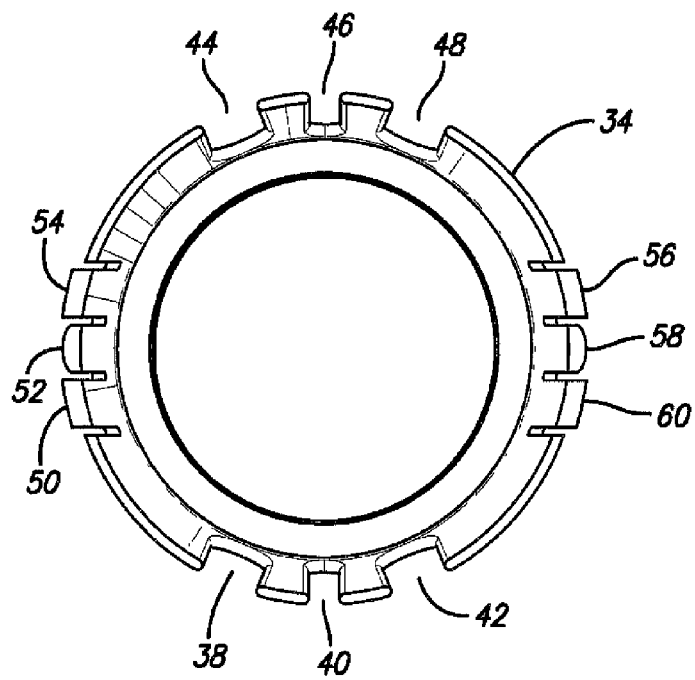
FIG. 7 is a top view of the liner.
Figure 8:
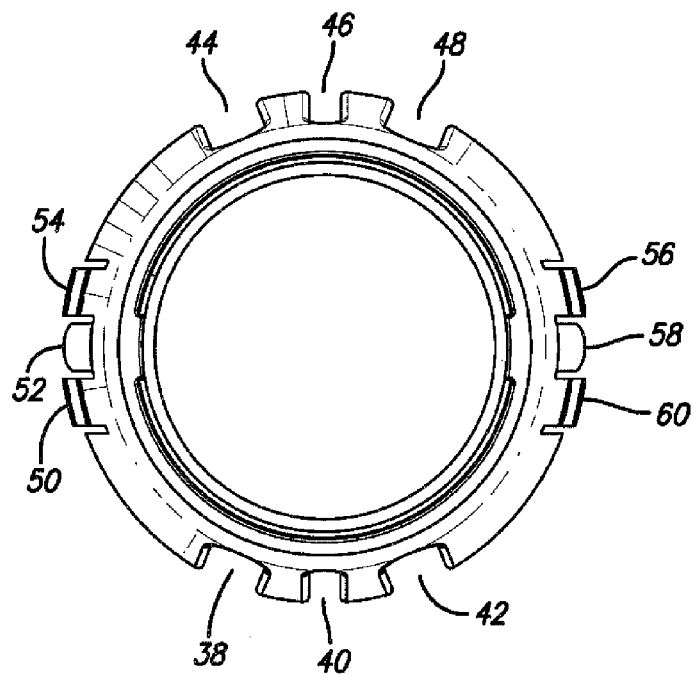
FIG. 8 is a bottom view of the liner.

The aperture through the work surface has a diameter, slightly larger than the diameter of lower liner 62. Upper liner 34 has a slightly larger base diameter 66 than the aperture and also angles outwardly from lower liner 62. Because of the larger base diameter 66 and the outward angle of upper liner 34, liner 32 will drop down into the aperture in the work surface but will stop moving down at the place where the upper liner 34 no longer fits into the aperture in the work surface, which is at the diameter 66 which has a slightly larger diameter than the aperture in the work surface FIG. 7 is a top view of upper liner 34 of liner 32. FIG. 8 is a bottom view of liner 32. Cut-outs 38, 40, 42 and 44, 46 and 48 allow cables or wires to pass through to be connected to a variety of devices, as stated above. They also help to separate and create a space between the cables and wires. They can also (if desired) organize the cables or wires in the same location, when a device is connected and reconnected. Knobs 50 through 60 connect with flanges 74 at the bottom inside of cap 10 (FIG. 9) to connect cap 10 to upper liner 34 of liner 32.

Figure 9:
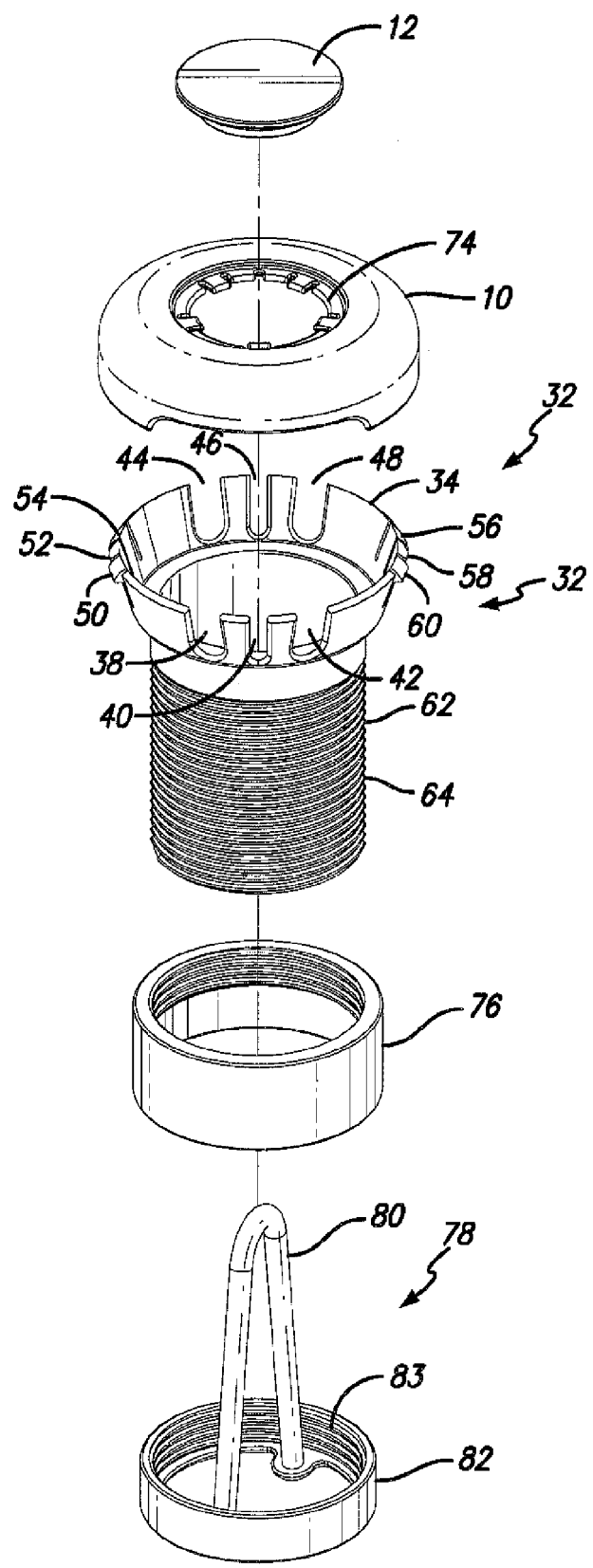
FIG. 9 is an exploded view of one embodiment of the grommet.

Referring to FIG. 9 there is shown a lock ring 76 with inner threads which threadably connect lock ring 76 onto lower liner 62. Lock ring 76 allows for a tool free installation of liner 32 and holds it firmly to the desk or table when it is moved upward to press against the bottom of the desk or a work surface. An optional cable lock anchor 78 with top ring 80 screws onto lower liner 62 of liner 32. Top ring 80 provides a safety ring through which a wire or cable can pass, which is attached to an electrical device, such as a laptop computer or other device, to protect it from theft. Top ring 80 is fixedly attached to locking ring 82, which has inner threads 83 so that it is removably attached to lower liner 62 by threads 64 and 83.

Figure 10:
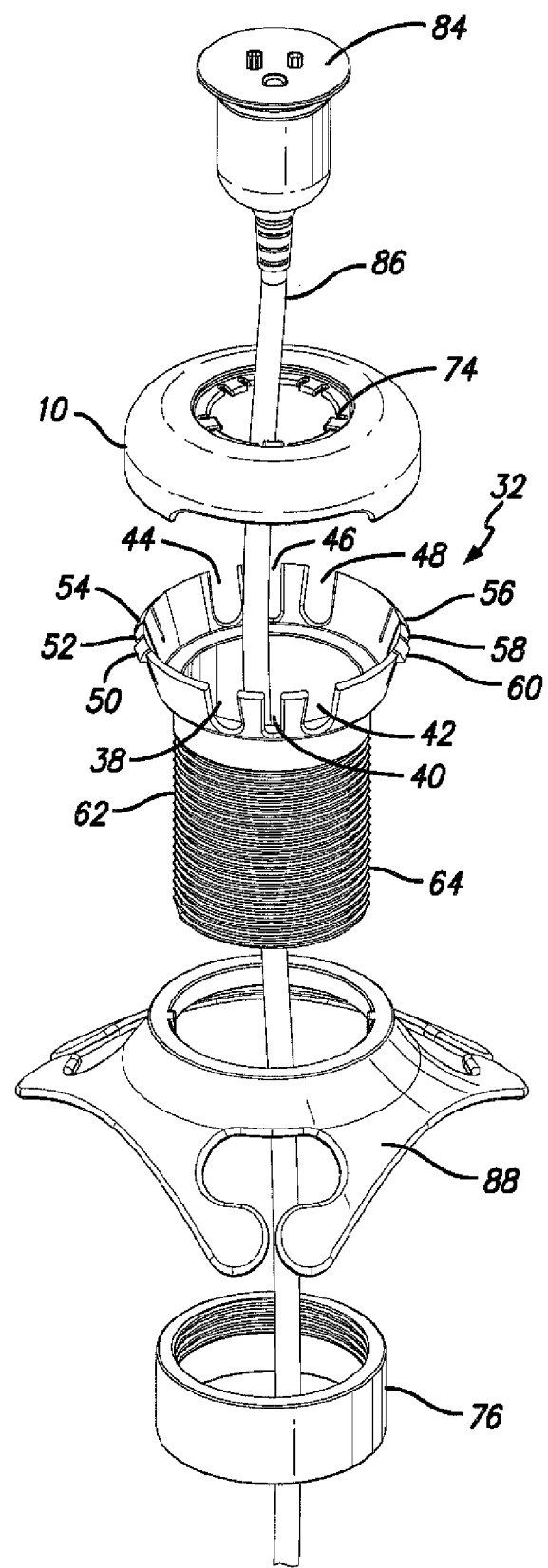
FIG. 10 is an exploded view of another embodiment of the grommet.

Referring to FIG. 10, there is shown the same cap 10, liner 32 and lock ring 76. In this embodiment there is an electrical cable 84 (see also FIG. 2) with a wire 86 which passes down through the grommet to plug into a source of electricity. An optional wire manager or cord wrap 88 can be slipped over, or screwed onto lower liner 62, so that it fits around lower liner 62 and is held there by lock ring 76. Excess cable or wire can be wound on wire manager 88.

Figure 11:
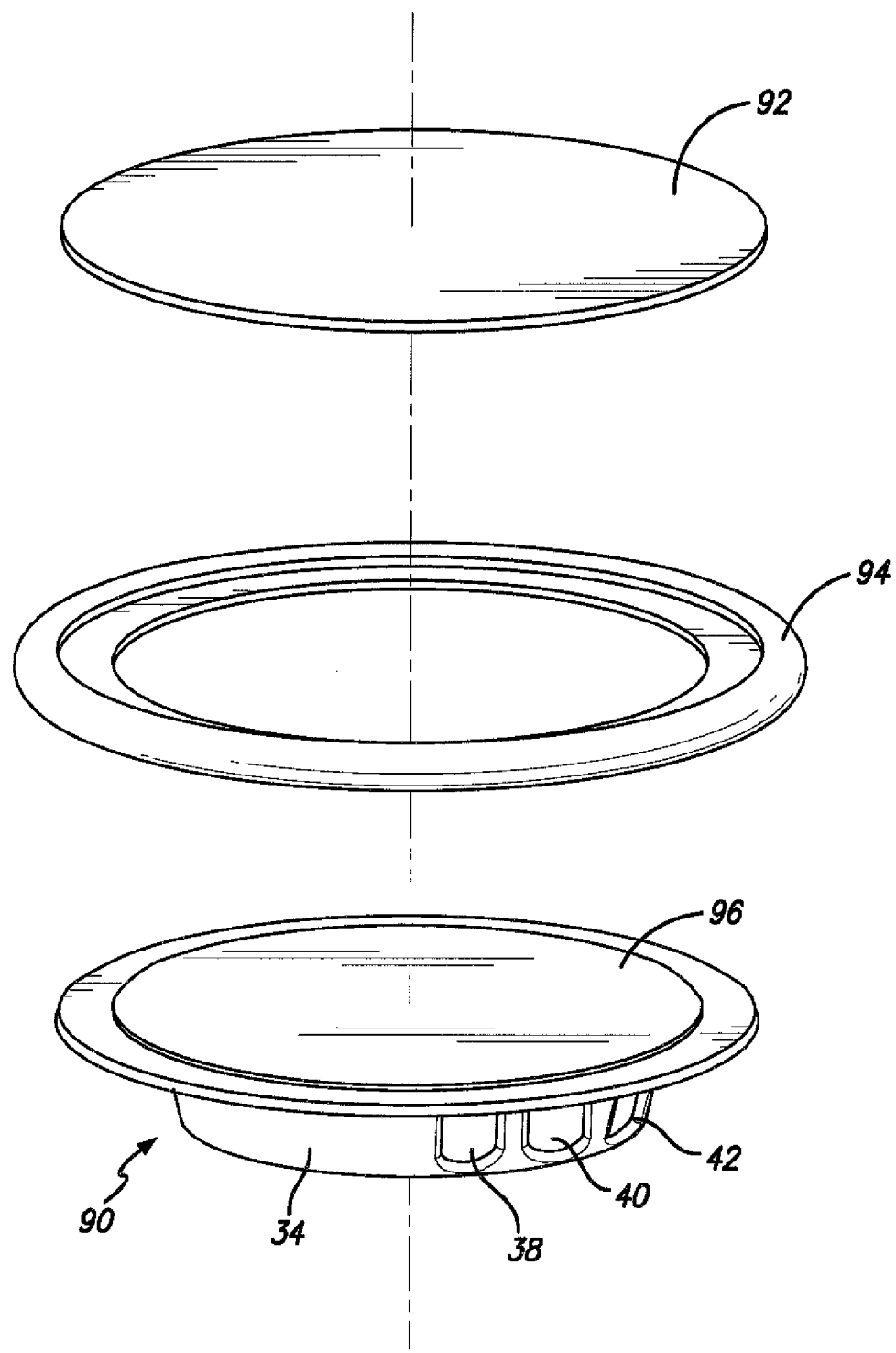
FIG. 11 is an exploded view of a platform top.
Figure 12:
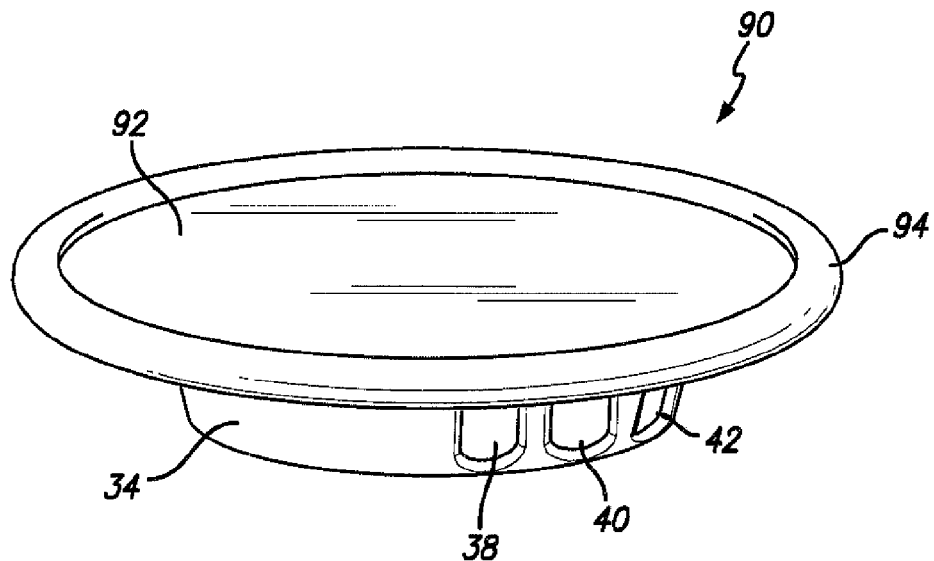
FIG. 12 is a perspective view of the platform of FIG. 11.
Figure 13:
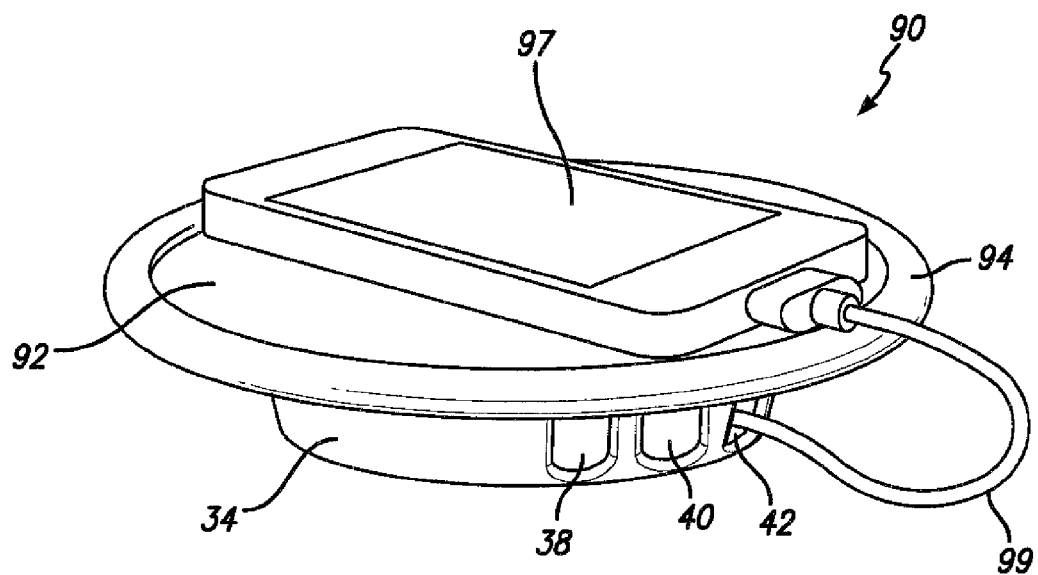
FIG. 13 is another perspective view of the cap of FIG. 11 with a device placed on the platform.
Figure 14:
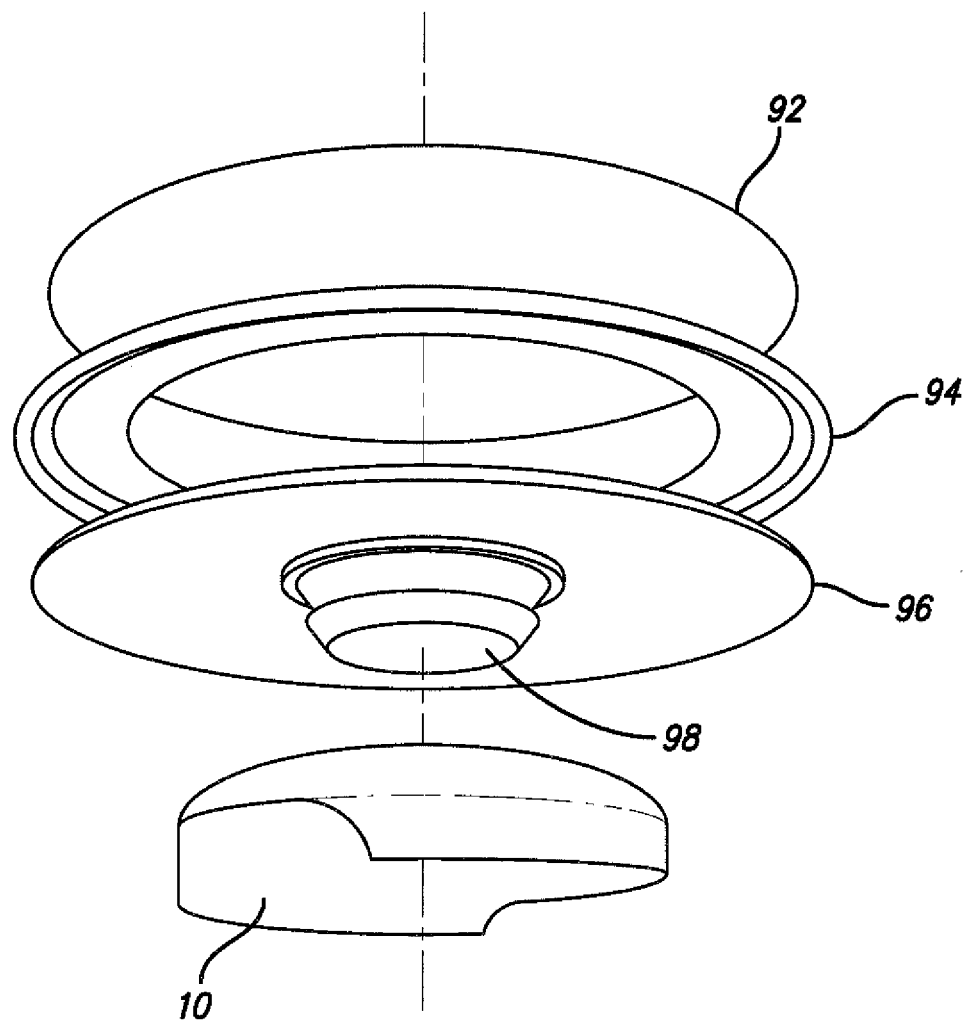
FIG. 14 is a perspective view from below of the platform.

Referring now to FIGS. 11, 12 and 13, there is shown another embodiment of the invention in which there is an elevated platform 90. Platform 90 has three parts, a pad 92 a ring 94 and a base platform 96. Ring 94 can be made of a metal or plastic and both pad 92 and ring 94 are bonded to base platform 96. Base platform 96 has a locking flange 98 which connects elevated platform 90 to cap 10 by flanges 74 in cap 10, as shown in FIG. 9. Base platform 96 can also be formed as one piece with cap 10.

Pad 92 has a thick rubber or neoprene elevated platform to provide usable space while the grommet underneath organizes cables. Elevated platform 92 may be used as a pad on which to place things, such as a cell phone 97, or other digital device, with a cord 99 connected thereto. Platform 90 neatly covers the connector ends until they are pulled out to plug into a laptop or smart phone or other digital device. Alternatively, platform 92 can be a wireless charging station for digital devices, which are well known.

Figure 15:
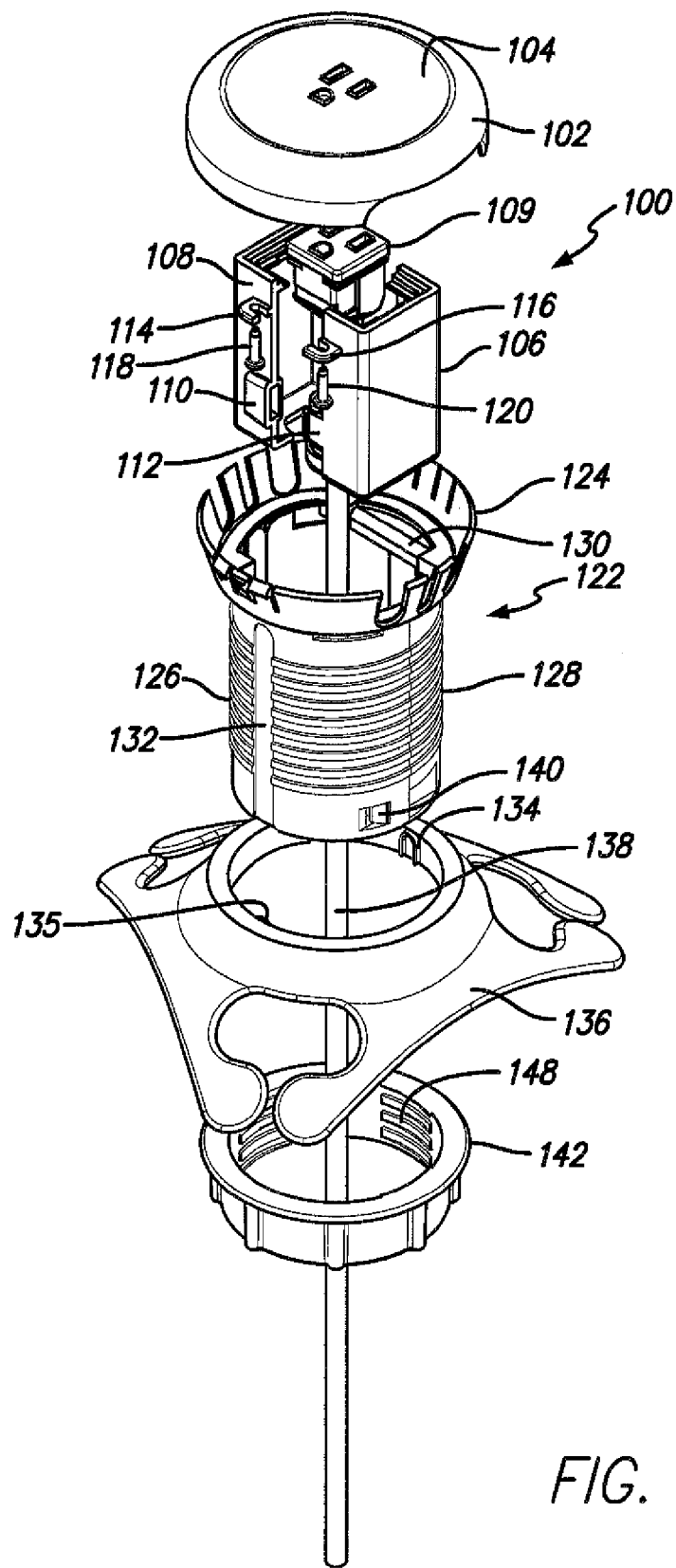
FIG. 15 is an exploded view of this embodiment.

Another embodiment of the grommet of this invention is shown in FIGS. 15-19. FIG. 15 is an exploded view of a grommet assembly 100 of this invention comprising a cap 102 having an electrical outlet 104. A two part housing receptacle 106 and 108 holds a simplex receptacle 109. Housing receptacle 106/108 is fitted and held together by coupling slot 110 and coupling tab 112. In addition, there are two screw tabs 114 and 116 and two screws 118 and 120 which are to connect housing 106 with cap 102.

A liner 122 comprises an upper liner 124 and a lower liner 126, lower liner 126 having an area of screw threads 128 going around the circumference of lower liner 126. Upper liner 124 has a series of knobs, the same as knobs 50-60 in the embodiment shown in FIGS. 4 and 5. Upper liner 124 also has a series of cut-outs, the same as the cut-outs 38-48 shown in FIGS. 4 and 5. Upper liner 124 also has a pair of liner couplings one of which 130 is shown, the matching coupling on the other side is not visible in this figure.

Lower liner 126 is manufactured in two parts, shown in FIG. 17 and discussed below. There are two vertical notches in the side of lower liner 126. One notch 132 is shown. The matching notch on the other side of lower liner 126 is not visible. The two notches are adapted to receive and hold two guide tabs 134 and 135 which guide placement of an optional wire manager or cord wrap 136 into place and be held there. Cord wrap 136 slides up over lower liner 126 and is adapted to wrap excess cable or wires, such as electrical wire 138, if needed.

In addition, lower liner 126 has two liner couplings 140, the other not visible, to be explained in detail below. Finally, lock ring 142, with inner threads 148, threadably attaches to lower liner 126, providing tool-less installation.

Figure 16:
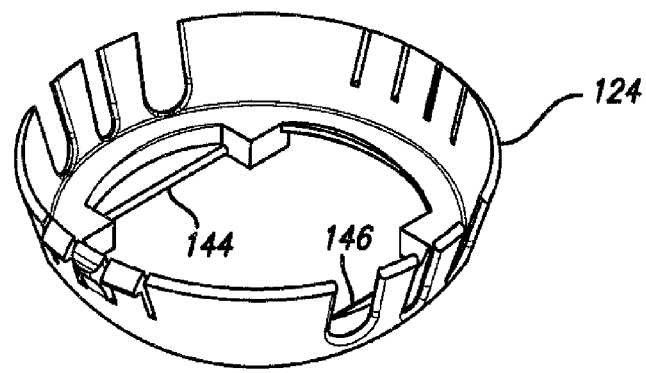
FIG. 16 is a perspective view of the upper liner.
Figure 17:
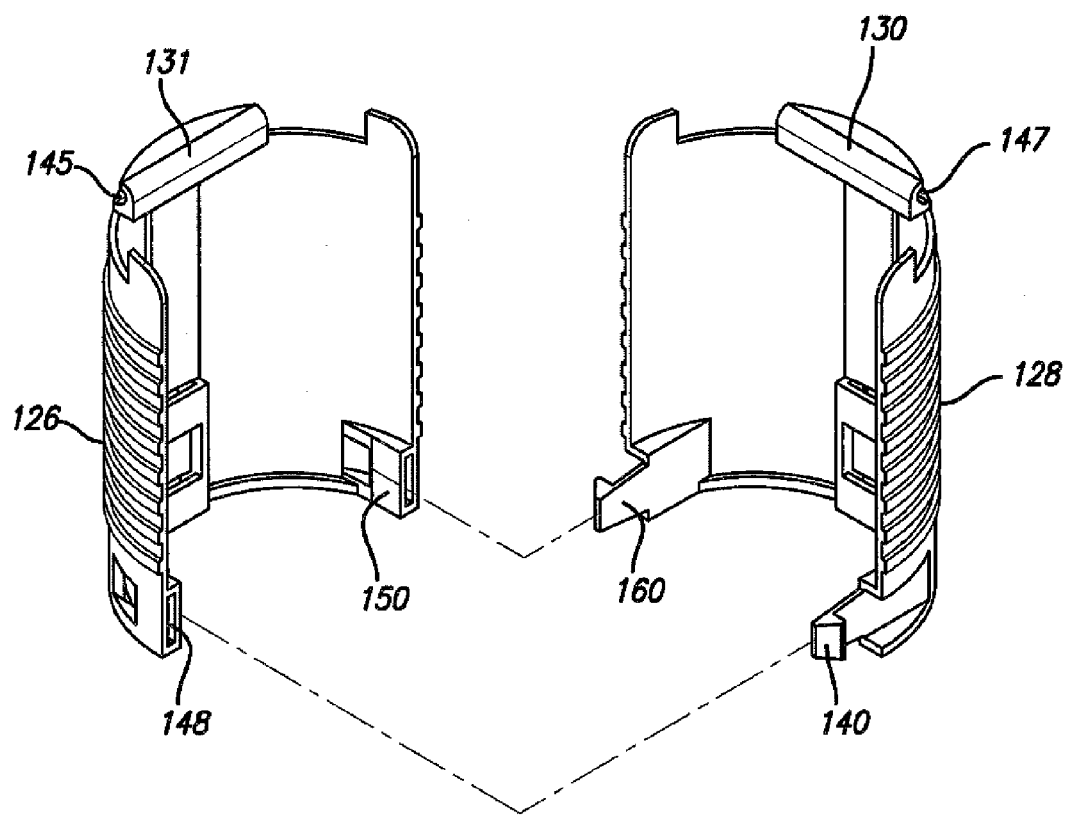
FIG. 17 is an exploded view of the lower liner.

Referring now to FIG. 16 there is a perspective view of upper liner 124 and FIG. 17 is an exploded view of the lower liner 126 with threads 128 on the outer surface. Upper liner 124 has tabs 144 and 146 which attach to lower liner slots 145 and 147 in coupling clips 130 and 131, to hold upper liner 124 and lower liner 126 together. Lower liner 126 comprises a female part on the left and a male part on the right, which connect together by coupling tabs 140 and 160 locking into coupling slots 148 and 150.

Figure 18:
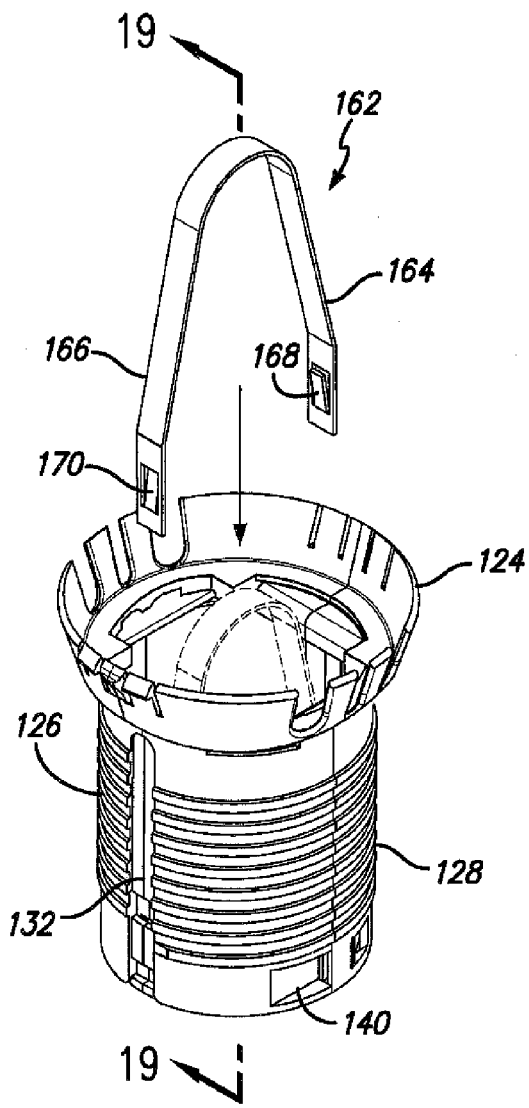
FIG. 18 is a perspective view of the liner with a cable lock anchor.
Figure 19:
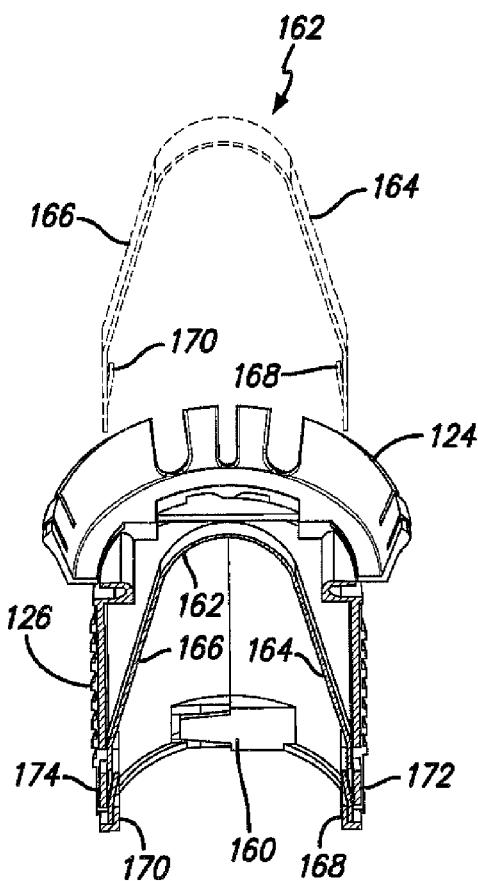
FIG. 19 is a cross-section taken on lines 19-19 of FIG. 18.

Referring now to FIG. 18, which is a perspective view and FIG. 19 which is a cross-section taken on lines 19-19 of FIG. 18, there is shown the attachment of an optional cable lock anchor 162 inside of lower liner 126. Cable lock anchor 162 has two legs 164 and 166. Near the bottom of each leg 164 and 166 is an anchor clip 168 and 170. Anchor clips 168 and 170 slide into and lock into anchor slots 172 and 174 in the lower part of liner 126. The cable lock anchor provides a safety ring through which a cable or wire can pass and be attached to any item, such as a laptop computer or other device, to protect it from theft.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture, and a substantially cylindrical lower liner having a threaded outer surface, and a lock ring having inner threads to be threadably attached to the lower liner in which the cap has one or more raised edges to allow wires or cords to pass underneath the cap.

2. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture, and a substantially cylindrical lower liner having a threaded outer surface, and a lock ring having inner threads to be threadably attached to the lower liner, in which the cap has a removable cap insert, in which the cap insert has holes for an electrical plug or a data port.

3. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture, and a substantially cylindrical lower liner having a threaded outer surface, and a lock ring having inner threads to be threadably attached to the lower liner in which the upper liner comprises a plurality of cut-outs through which wires or cords can pass.

4. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture, and a substantially cylindrical lower liner having a threaded outer surface, and a lock ring having inner threads to be threadably attached to the lower liner in which the upper liner comprises a plurality of knobs utilized to connect the cap to the upper liner.

5. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture and a substantially cylindrical lower liner having a threaded outer surface, and a lock ring having inner threads to be threadably attached to the lower liner in which a cable lock anchor is threadably attached to the lower liner.

6. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture and a substantially cylindrical lower liner having a threaded outer surface, and a lock ring having inner threads to be threadably attached to the lower liner in which a wire manager is slipped over or screwed onto the lower liner.

7. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture, and a substantially cylindrical lower liner having a threaded outer surface, the lower liner comprising two separate parts, means to connect the two parts together, and a lock ring having inner threads to be threadably attached to the lower liner further comprising a cord wrap which slides over the lower liner.

8. The power, communications and data grommet of claim 7 in which the lower liner comprises vertical notches and the cord wrap comprises guide tabs which fit into the vertical notches.

9. A power, communications and data grommet mounted in an aperture in a work surface comprising, a housing adapted to fit into the aperture, said housing comprising a cap removably connected to a liner, the liner comprising an upper liner and a lower liner, the upper liner flaring outwardly to prevent the grommet from falling through the aperture, and a substantially cylindrical lower liner having a threaded outer surface, the lower liner comprising two separate parts, means to connect the two parts together, and a lock ring having inner threads to be threadably attached to the lower liner further comprising a cable lock anchor having two legs, each leg having an anchor clip adapted to fit into an anchor slot in the lower liner.

\* \* \* \* \*